United States Patent
Knowlton et al.

(10) Patent No.: US 8,692,520 B2
(45) Date of Patent: Apr. 8, 2014

(54) METHOD AND SYSTEM FOR OPTIMIZING CURRENT LIMITING BEHAVIOR OF CHARGER

(75) Inventors: Timothy J Knowlton, Benson, AZ (US); Christopher Fischbach, Tucson, AZ (US)

(73) Assignee: Standard Microsystems Corporation, Hauppague, NY (US)

( * ) Notice: Subject to any disclaimer, the term of this patent is extended or adjusted under 35 U.S.C. 154(b) by 370 days.

(21) Appl. No.: 13/233,949

(22) Filed: Sep. 15, 2011

(65) Prior Publication Data

US 2013/0069600 A1    Mar. 21, 2013

(51) Int. Cl.
*H02J 7/04* (2006.01)
*H02J 7/16* (2006.01)

(52) U.S. Cl.
USPC ........................................................ 320/162

(58) Field of Classification Search
USPC ....................................................... 320/162
See application file for complete search history.

(56) References Cited

U.S. PATENT DOCUMENTS 6,105,097 A * 8/2000 Larky et al. ................... 710/314
2009/0206794 A1 * 8/2009 Ferguson ...................... 320/134

* cited by examiner

*Primary Examiner* — Arun Williams
(74) *Attorney, Agent, or Firm* — King & Spalding L.L.P.

(57) ABSTRACT

A method and system for optimizing the behavior of a charger connected to a portable device when the portable device current exceeds the charger current limit. The system includes a configuration module configured to set a maximum current limit and a register-based current limit values. The system further includes a port power switch configured to limit the portable device current, in the event that the portable device current exceeds the maximum current limit value. The port power switch is configures to modify the portable device current to a predetermined constant current value or reset the current to zero based on the relation between the maximum current limit and the register-based current limit value.

16 Claims, 3 Drawing Sheets

METHOD AND SYSTEM FOR OPTIMIZING CURRENT LIMITING BEHAVIOR OF CHARGER

TECHNICAL FIELD

The present invention relates to computing devices, and more particularly to systems and methods for charging batteries of portable devices.

BACKGROUND

Portable electronic devices such as MP3 players, cameras, and cell phones are typically fitted with a USB port, which allows them to transfer data to or from other controllers or hosts. Using these USB ports, portable devices may conveniently draw current from personal computers to charge their batteries. In light of this convenience, engineers have developed standalone or dedicated USB chargers that expose a USB standard receptacle to portable devices, allowing them to use the same USB port to charge either from a computer or a dedicated USB charger.

USB chargers generally include a port power switch for limiting the current drawn by a connected portable device. The port power switch defines the maximum current limit for the charger. Different portable device and charging protocols expect different behavior from the port power switch when the current drawn by the portable devices exceeds the maximum current limit value. These behaviors include "Tripping" (reducing charging current to zero or near zero value), "Foldback" (decreasing both voltage output and current output to a desired value), "Constant-Current" (decreasing voltage while maintaining charging current), or turning the switch on and off. The port power switch behaves in one of these ways to reduce the internal power dissipated by the charger.

Various cell phone and cellular chipset manufactures are not aware of an appropriate voltage-to-current slope when limiting the current to a constant value. When switching to constant current behavior, the port power switch conventionally exhibits a fixed slope for the rate of modification of current and voltage. It should be understood that the maximum current limit value varies for various charging protocols. Thus, the current systems exhibit a fixed slope, such as 10V/A or 100V/A, irrespective of the value of the maximum current limit value, such as 0.5 A or 1A.

Moreover, with growing complexity in portable devices, the battery chargers must be compatible with these portable devices and their associated multiple charging protocols. Each charging protocol defines a different maximum current limit value for the port power switch and thus, the operation of the port power switch varies for different values of current drawn. These varying characteristics of various charging protocols make current chargers incompatible with all charging protocols.

Therefore, there exists a need for a suitable method and system for current limiting the current drawn by a portable device using a power switch. The port power switch being compatible with any charging protocol.

SUMMARY

Briefly described, and according to one embodiment, the present disclosure describes a system for optimizing the behavior of a charger connected to a portable device when the portable device current exceeds the charger current limit. The system includes a configuration module configured to set a maximum current limit and a register-based current limit values. The system further includes a port power switch configured to limit the portable device current, in the event that the portable device current exceeds the maximum current limit value. The port power switch is configures to modify the portable device current to a predetermined constant current value upon a determination that the maximum current limit is less than the register-based current limit value. In addition, the port power switch resets the portable device current to zero upon a determination that the maximum current limit is greater than the register-based current limit value.

According to another embodiment, the present disclosure describes a method for optimizing the current limiting behavior of a battery charger, having a port power switch, and supports a plurality of charging profiles. The method includes setting up a maximum current limit and register-based current limit values for the plurality of charging profiles. Next, the method applies a charging profile from the plurality of charging profiles to a portable device connected to the charger. Upon a determination that the portable device current exceeds the maximum current limit value, the method perform one of: modifying the portable device current to a predetermined constant current value when the maximum current limit value is set below the register-based current limit value, or modifying the portable device current to zero when the maximum current limit value is set greater than the register-based current limit value.

Figure 1:
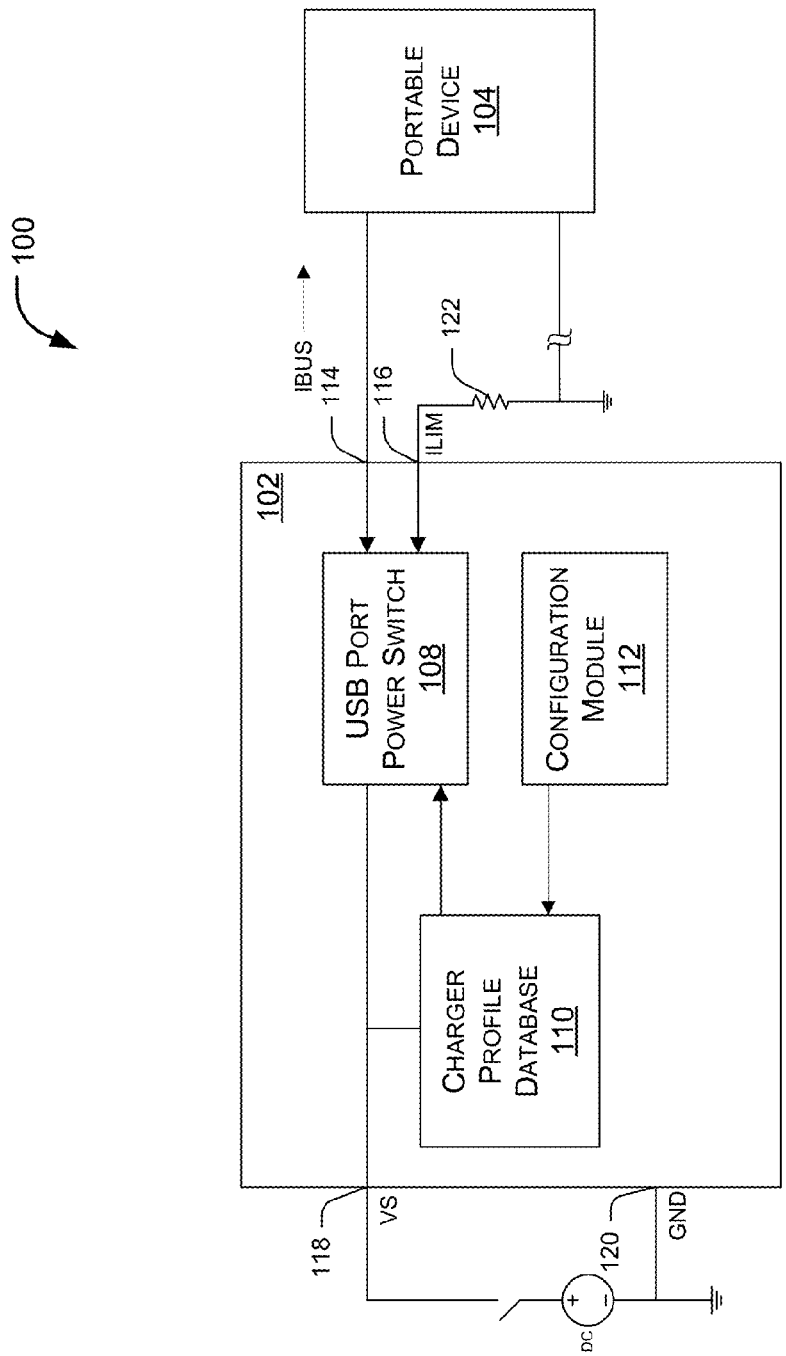
FIG. 1 is a block diagram illustrating an exemplary system where embodiments of the present disclosure may function.

While the invention is amenable to various modifications and alternative forms, specific embodiments are shown by way of example in the drawings and are described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION

Overview

The following terms are used throughout this document and are defined here for clarity and convenience.

Attach refers to a physical electrical connection between a downstream device and an upstream port.

Connection refers to the state in which a downstream device is attached to an upstream port, and the downstream device has pulled either $D_P$ (Data Plus) or $D_M$ (Data Minus) signals high through a resistor, in order to enter signaling.

Disconnect refers to the loss of active USB communication between a USB host and a USB device.

Standard Downstream Port is a downstream port on a device that complies with the USB2.0 definition of a host or a hub. That standard specifies that a downstream device will draw less than 2.5 mA when unconnected, up to 100 mA when connected, and up to 500 mA if so configured and not suspended.

Charging Downstream Port (CDP) is a downstream port on a device that complies with the USB 2.0 definition of a host or a hub, except that a downstream device is permitted to draw in excess of 500 mA up to $I_{DCHG}$ while simultaneously communicating with a host device.

Dedicated Charging Port (DCP) refers to a downstream port on a device that outputs power through a USB connector, but is not capable of enumerating a downstream device. A dedicated charging port is required to allow a downstream device to draw at a minimum current of $I_{DCHG}$ at an average voltage of $V_{CHG}$.

DCD (Device Connection Detection) refers to an action taken by downstream devices, when $V_{BUS}$ is applied, to determine when the $D_P$ and $D_M$ pins are connected to a USB host.

Legacy Device may be USB device that requires application of non-BCS signatures on the $D_P$ and $D_M$ pins prior to application of $V_{BUS}$.

Downstream Device is a USB device connected on the $D_P$ and $D_M$ pins of a host device and that acts as a slave to the host device.

Charger Emulation Profile refers to the reactive handshake applied on the $D_P$ and $D_M$ pins to emulate a specific charger type such as a BCS CDP or a legacy dedicated charger device.

USB Charger includes a device with a dedicated charging port, such as a wall adapter or a car power adapter.

Portable Device refers to any USB or on-the-go (OTG) device that is capable of operating from its own battery and the device is also capable of drawing current from its USB port for the purpose of operating and/or charging its battery.

Embodiments of the present invention are directed to a battery charging method and system that utilizes a port power switch to limit the current drawn by a portable device over a USB port. In general, the port power switch operates in constant current mode when the portable device current exceeds the maximum current limit of the switch. As different charging protocols have varying current limit values and expect a different current limiting behavior from the port power switch, the embodiments of the present disclosure employ an additional register-based current limit value that allows the battery charging system to be compatible with various protocols. The register-based current limit value is set for each charging profile and its relationship with the maximum current value dictates the behavior of the port power switch.

If the maximum current limit value is less than the register-based current limit value, the USB port power switch operates in constant current mode when current drawn by the portable device exceeds the maximum current limit value. In that mode, the portable device draws a fixed constant current value, which may be a predetermined value. If the maximum current limit value is greater than the register-based current limit value, the port power switch trips when the portable device current exceeds the maximum current limit value. "Trip" refers to a situation when current and voltage output from the port power switch is reduced to zero, and consequently, the portable device current also reduces to zero. The present disclosure facilitates programming the values of both the current limit parameters. In addition, when the port power switch is expected to switch to constant current mode, the current drawn by the portable device may be a predetermined value, which may be common to all charging profiles.

Exemplary System

FIG. 1 is a block diagram illustrating an exemplary system 100 where embodiments of the present disclosure may function. The system 100 includes a battery charging system 102 connected to a portable device 104 via a connector such as a USB connector (not shown). Further, the battery charging system 102 includes a USB port power switch 108, a charging port profile database 110, and a configuration module 112.

The battery charging system 102 may include pins for transfer of data or signals from or to external devices such as the portable device 104. The pins may include IBUS 114, ILIM 116, VS 118, and GND 120, among other pins of the system 102. Input voltage is provided to the system 102 via VS 118, which may be connected to a power supply. IBUS 114 allows transfer of charging current from the system 102 to the portable device 104, and the current flowing across IBUS 114 may be limited by ILIM 116 that selects the maximum current limit at power up. ILIM 116 is connected to ground through a resistor 122. GND 120 connects the charging system 102 to ground.

In general, the battery charging system 102 may be a universal battery charger, which may charge any portable device. The battery charging system 102 may be a standard downstream port or a charging downstream port. Moreover, the battery charging system 102 may be compatible with either versions 1.1 or 1.2 of the battery charging specification. Alternatively, the charging system 102 may be compatible with legacy devices. According to another embodiment, the system 102 may include an emulation circuit that allows the USB port to emulate any known or configurable charging ports making the port compatible with any portable device available. In addition, to emulate any charging port, the battery charging system 102 may utilize multiple known charging profiles. Alternatively, battery charging system 102 may cycle between various known charging profiles unless the connected portable device starts charging.

To assure compliance with multiple charging standards or profiles, the battery charging system 102 stores a set of USB charging port profiles in the profile database 110. USB charging port profiles are defined by voltage-current operating boundaries. The system 100 may be preloaded with a number of charging port profiles such as an SDP port power profile, a CDP port power profile, a DCP port power profile, or other known profiles. Apart from the known charging profiles, the present disclosure stores a customized charging port profile that may be updated any time. Each of these charging port profiles operates in a different current-voltage region.

The battery charging system also includes a switch such as the USB port power switch 108, which protects the system 100 from excess current using current limiting characteristics. In general, the port power switch limits the current drawn by the portable device 104 by setting a maximum current limit value for the battery charging system 102. At power-up, this current limit is typically determined by the value of resistor 122, connected to the ILIM pin 114. Table 1 lists a set of maximum current limit values based on resistor 122.

TABLE 1

| Resistor (Ohms) | ILIM |
| --- | --- |
| 47k | 500 mA |
| 56k | 900 mA |
| 68k | 1000 mA |
| 82k | 1200 mA |
| 100k | 1450 mA |
| 120k | 1800 mA |
| 150k | 2000 mA |
| Open | 2500 mA |

Conventionally, the port power switch 108 operates in three operational modes: disabled mode, constant voltage mode, or constant current mode. Both constant voltage and constant current modes are utilized depending on the current drawn by the portable device 104. The following section describes these three operating modes in detail:

Disabled mode: When the power switch 108 is turned on, charging system 102 is powered and ready to charge the portable device 104. When the power switch 108 is disabled, the charging system 102 lies in a low power state.

Constant voltage mode: Here, USB port power switch 108 functions as a low resistance switch. When a downstream device is connected, constant voltage mode is automatically activated. Further, constant voltage mode is also applicable when charger emulation is active. While operating in constant voltage mode, the output voltage is held relatively constant, substantially equivalent to the input voltage provided at VS 118, for all current values up to the maximum current limit value. If the current drawn by the connected device exceeds the maximum current limit value, then the port power switch may trip (disable), the system may enter the error state, or a fault handling circuit may determine subsequent actions.

Constant current mode: This mode is enabled automatically when current drawn by downstream device exceeds the maximum current limit value. At the current limiting point, the port power switch typically transitions from constant voltage mode to constant current mode. In constant current mode, the port power switch reduces its output voltage to a value less than its input voltage while maintaining its current draw at a constant value.

In general, different charging profiles require different behavior from the port power switch 108 as the charging current reaches the maximum current limit value. Certain profiles require switching from constant voltage mode to constant current mode. Alternatively, some profiles expect the port power switch 108 to "trip", driving output current and voltage to zero. Further, charging profiles typically call out different maximum current limit values. Under constant current, the port power switch 108 typically exhibits a fixed type of voltage-current response. While transitioning from constant voltage to constant current mode, the voltage decreases and current falls to a fixed constant value. Conventionally, the voltage-current roll off (the rate of modification of voltage and current) is set at a fixed rate irrespective of the value of the maximum current limit.

Embodiments of the present disclosure allow the port power switch 108 to adapt to various charging profiles. The behavior of the port power switch 108 at current limiting is controlled by its maximum current limit value and an additional parameter—register-based current limit characteristic value, (hereafter, "register-based current limit value"), discussed in the following section. In addition, the present disclosure defines dissimilar voltage-current roll off for each charging profile upon reaching current limiting. To this end, the present disclosure defines a fixed constant current output during constant current mode, the fixed constant current value being common to all the charging profiles.

The register-based current limit value defines the upper current limit behavior value of the battery charging system 102. The register-based current limit value is a digital value set for each charging port profile to establish its behavior at current limiting. The system 100 may include a set of digital registers to store the register-based current limit value for each charging profile. In an embodiment, these digital registers may be part of the charging profile database itself. The present disclosure also allows reconfiguring the value of the maximum current limit and register-based current limit values to alter the behavior of the port power switch 108 at current limiting.

The system 100 includes the configuration module that allows configuring the value of the maximum current limit and register-based current limit values. The configuration module sets the maximum current limit value for the power switch 108 at power up, using the resistor 122. In addition, the configuration module facilitates reconfiguring the maximum current limit value after power up via the I2C/SMBus, which are protocols enabling the charging system 102 to communicate with external devices. The charging system 102 communicates with a host controller, such as an SMSC SIO, through the SMBus. The programmed maximum current limit, however, may not exceed the current limit set using the resistor 122. Further, the system 100 allows modifying the maximum current limit value of the battery charging system 102 for each charging profile. These current limit values can be stored in the profile database or any external database known to those skilled in the art.

The configuration module also allows modification to the register-based current limit value stored in the digital register set. The register-based current limit value may be set at manufacture, and it conforms to the USB-IF BC1.X Dedicated Charging Port maximum current value. An technician or a user, however, can modify the register-based current limit value as desired.

The relationship between the maximum current limit value and the register-based current limit value dictates the operation of the port power switch 108. The register-based current limit value may be set greater or less than the maximum current limit value. If the register-based current limit value is greater than the maximum current limit value, and the portable device current exceeds the maximum current limit, port power switch 108 operates in constant current mode That mode modifies the current drawn to a predetermined value and decreases the output voltage. For other charging profiles, the register-based current limit value may be set below the maximum current limit value. In such situations, the port power switch 108 operates at constant voltage until current limiting has not reached, and subsequently, the switch 108 trips to reduce the output current and voltage to zero.

For the SDP port power profile, the register-based current limit value may be set to 100 mA in order to operate the port power switch 108 in constant voltage mode exclusively for any value of the maximum current limit value, for example. For the DCP port power profile, however, the register-based current limit value is set to 1.5 A. With this profile, for maximum current limit value set below 1.5 A, the port power switch 108 operates in constant current mode when the current drawn exceeds the maximum current limit. If the maximum current limit is set higher than 1.5 A, the port power switch 108 operates in constant voltage mode unless the current value exceeds the maximum current limit value. The custom port power profile allows modification of the two current limit values at any time allowing the port power switch 108 to operate in constant voltage mode, constant voltage mode, or forcing the switch to trip, as desired.

In addition, the configuration module identifies a fixed constant current for operating the battery charging system 102 in constant current mode. This value may be fixed between the maximum current limit and register-based current limit values. In general, the fixed constant current value may be less than or equal to the register-based current limit value, and it may be greater than or equal to the maximum current limit value. The fixed current value is common to various charging profiles, and this value may be predetermined or may be modified by a technician or user. As previously discussed, the conventional port power switch exhibit a constant voltage-current roll off while transitioning from constant voltage to constant current mode. With the fixed constant current value, the roll off for each charging profile will also vary.

The following section describes the varying behavior of the port power switch 108 based on the values of the maximum current limit value and register-based current limit value using a behavior chart. Further, the chart demonstrates varying current-voltage roll-offs to attain constant current mode.

Figure 2:
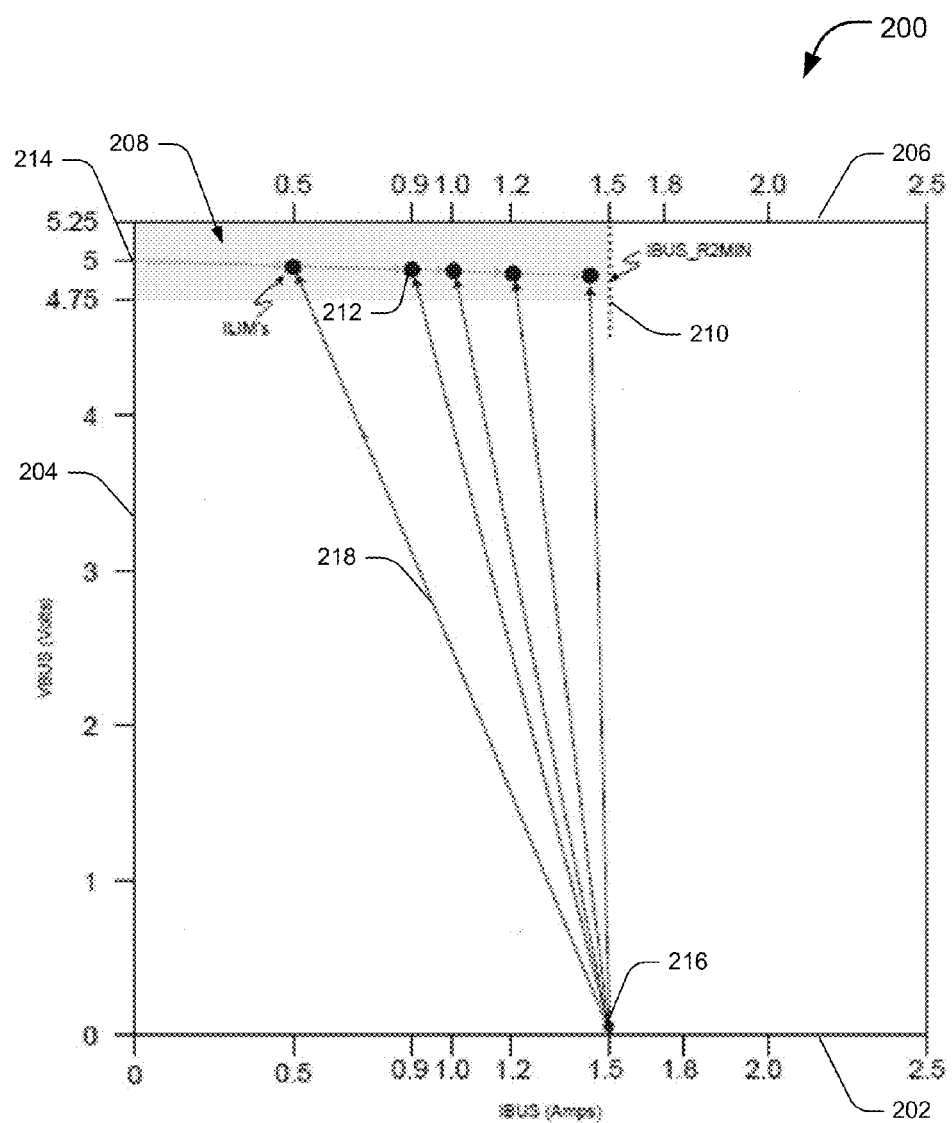
FIG. 2 is an exemplary chart depicting the behavior of a port power switch having the maximum current limit value being set less than the register-based current limit value.
Figure 3:
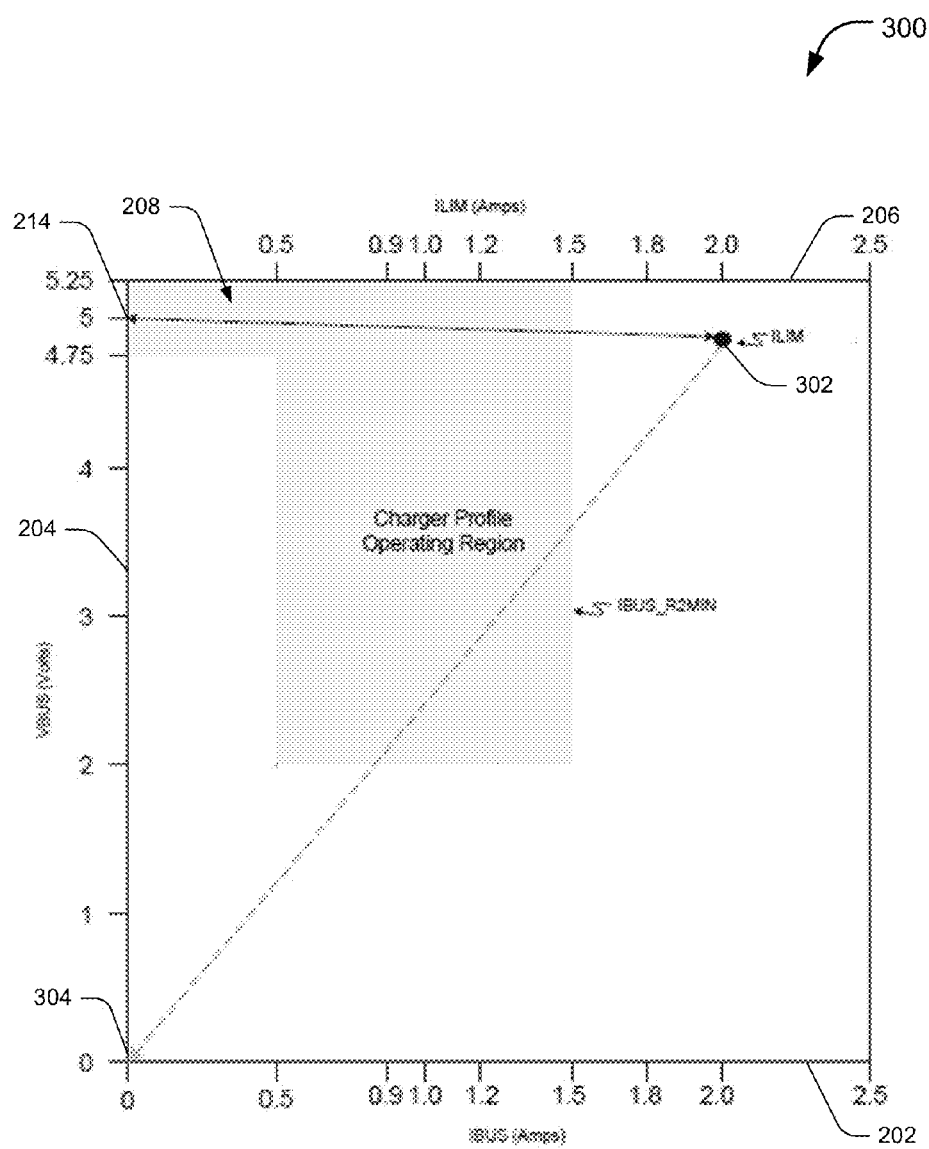
FIG. 3 is an exemplary chart depicting the behavior of a port power switch having the maximum current limit value being set greater than the register-based current limit value.

FIGS. 2 and 3 illustrate the behavior of the port power switch 108 with varying charging profiles. There, charts 200, 300 depict the behavior of the port power switch 108 when the maximum current limit value is set below and greater than the register-based current limit value, respectively.

Charts 200 and 300 depict the variation in charging current denoted as IBUS (primary X-axis 202), voltage output from the port power switch 108 denoted as VBUS (primary Y-axis 204), and maximum current limit value denoted at ILIM (secondary Y-axis 206). Further, a shaded area 208, defining a voltage-current region, outlines a charging port profile operating region for the port power switch 108. This operating region is restricted by a boundary condition that identifies an upper current limit for the USB charging system 102. The register-based current limit value includes this upper current limit value, and the register-based current limit value is contained within each charging port profile. A dotted line 210 depicts this boundary condition, and the register-based current limit value is denoted as IBUS_R2MIN. The charts also represent the maximum current limit value for various charging profiles, denoted by current limiting points ILIM 212. It should be understood that the battery charging system 102 will apply only one charging profile at any point in time; the chart 200, however, shows multiple ILIM values to depict the behavior of the port power profile with varying profiles.

In chart 200, IBUS_R2MIN is set greater than ILIM, and thus the port power switch 108 shifts from constant voltage mode to constant current mode. Start point 214 represents a point at which the portable device 104 connects to the battery charging system 102. At start, the output voltage VBUS may be substantially equal to the input voltage applied at VS, and the port power switch operates in constant voltage mode with current IBUS increasing and voltage being set to a fixed value. Chart 200 shows an embodiment of the present disclosure where VBUS attains a constant value of 5 Volts and IBUS starts increasing from the start point 214. The voltage current slope maintains a substantial straight line until the current limiting point 212. Current limiting point 212 defines the maximum current limit value for the port power switch 108 associated with each charging profile. Subsequently, the port power switch 108 operates in constant current mode.

Because the current output exceeds the ILIM for each charging profile, the output voltage is reduced and the current output is set to a fixed constant current value. The transition from constant voltage mode to constant current mode starts by reducing the voltage and increasing the output current slightly until reaching a constant current point 216. At constant current point 216, the output voltage VBUS is reduced to zero and current IBUS increases slightly to 1.5 Amps. Constant current point 216 represents the portable device current during the constant current mode of the port power switch 108. The present disclosure allow the system 100 to determine the current output in constant current mode. As shown, the constant current point 216 is common to all the charging profiles. Thus, any applied charging profile when observes port power switch current limiting starts drawing the fixed common current value denoted by the constant current point 216.

For each charging profile, while transitioning from constant voltage to constant current, the current and voltage values modify at different rates (depicted by slopes 218). As shown, the current and voltage output values converge at the common point, constant current point 216, for any charging profile.

The constant current point 216 is a common point for any charging profile. Those skilled in the art will understand that the chart 200 represent the constant current point 216 with zero output voltage and 1.5 amp current; the output current and voltage values, however, may differ. The constant current value is determined based on the values of the maximum current limit value (ILIM) and register-based current limit value (IBUS_R2MIN). The constant current value may be equal to or less than the register-based current limit value (IBUS_R2MIN) and may be greater than or equal to the maximum current limit value (ILIM). Further, the voltage VBUS at constant current point 216 is reduced, but this value may or may not be set to zero. Further, the rate of change of IBUS and VBUS (depicted by slopes 218) also varies based on the value of ILIM and IBUS_R2MIN.

Once the port power switch 108 operates in constant current mode, the portable device 104 continues drawing a constant current defined by the constant current point 216 unless the device is fully charged. It should be understood that in constant current mode if the output current IBUS exceeds the constant current value or the output voltage reduces below the voltage defined by the constant current point, the port power switch would trip and terminate charging.

FIG. 3 illustrates a chart 300 depicting the behavior of the port power switch 108 when the maximum current limit value is set greater than the register-based current limit value. In this case, the port power switch shifts from the constant voltage mode, attained at start up, to disabled mode.

As discussed with chart 200, the start point 214 represents a point at which the portable device 104 connects to the battery charging system 102 and the port power switch operates in constant voltage from the start point 214. The port power switch 108 operates in the constant voltage mode until current limiting is achieved. A trip point 302 depicts a point at which the current drawn by the portable device 104 exceeds the maximum current limit value ILIM. As shown, the maximum current limit value ILIM at trip point is greater than the register-based current limit value IBUS_R2MIN. At 302, the port power switch output current and voltage starts reducing until it reaches the disable point 304, where the current and voltage become zero. This reduction of voltage and current to zero from the trip point 302 is referred to as "tripping," and it produces the disabled mode of the port power switch. For any charging profile whose maximum current limit value is greater than the register-based current limit value, the port power switch trips when the portable device reaches the current limiting point.

The methods and systems discussed in the present disclosure provide a battery charging system that limits the current drawn by a portable device. The charging system includes a port power switch that operates in constant current mode or trip based on the value of the maximum current limit for the port power switch and a register-based current limit value. Using these two current limit values, the battery charging system is compatible with any port power charging profile having varying maximum current limit value. In addition, the charging system also determines the charging current during the constant current mode operation of the port power switch.

Those in the art will understand that the steps set out in the discussion above may be combined or altered in specific adaptations of the disclosure. The illustrated steps are set out to explain the embodiment shown, and it should be anticipated that ongoing technological development will change the manner in which particular functions are performed. These depictions do not limit the scope of the present disclosure, which is determined solely by reference to the appended claims.

What is claimed is:

1. A system for optimizing the current limiting behavior of a charger connected to a portable device, the system comprising:
   a configuration module configured to set a maximum current limit and a register-based current limit values; and
   a port power switch configured to limit the portable device current, in the event that the portable device current exceeds the maximum current limit value, the port power switch being configured to:
      modify the portable device current to a predetermined constant current value upon a determination that the maximum current limit is less than the register-based current limit value; and
      reset the portable device current to zero upon a determination that the maximum current limit is greater than the register-based current limit value.

2. The system of claim 1, wherein the configurable module sets register-based current limit value for a plurality of charging profiles.

3. The system of claim 1, wherein the configurable module sets maximum current limit value for a plurality of charging profiles.

4. The system of claim 2, wherein the predetermined constant current value is set common to all the charging profiles.

5. The system of claim 1, wherein the port power switch operates in a constant current mode when the portable device current is set to the predetermined constant current value.

6. The system of claim 1, wherein the port power switch reduces its output voltage to less than the input voltage when the portable device current is set to the predetermined constant current value.

7. The system of claim 1, wherein the predetermined constant current value is set greater than or equal to the maximum current limit value and set lower than or equal to the register-based current limit value.

8. The system of claim 1, wherein the port power switch trips when the portable device current is reduced to zero.

9. The system of claim 1, wherein register-based current limit value is stored in a digital register.

10. A method for optimizing the current limiting behavior of a battery charger, having a port power switch, which supports a plurality of charging profiles, the method comprising:
    setting up a maximum current limit and register-based current limit values for the plurality of charging profiles;
    applying a charging profile from the plurality of charging profiles to a portable device connected to the charger;
    upon a determination that the portable device current exceeds the maximum current limit value, performing:
       modifying the portable device current to a predetermined constant current value when the maximum current limit value is set below the register-based current limit value; or
       modifying the portable device current to zero when the maximum current limit value is set greater than the register-based current limit value.

11. The method of claim 10, wherein the predetermined constant current value is set common to all the charging profiles.

12. The method of claim 10, wherein the applying step includes operating the port power switch in a constant voltage mode.

13. The method of claim 10, wherein modifying the portable device current to the predetermined constant current value step includes operating the port power switch in a constant current mode.

14. The method of claim 10, wherein modifying the portable device current to zero step includes tripping the port power switch.

15. The method of claim 10, wherein modifying the portable device current to the predetermined constant current value step includes reducing the output voltage of the charger to less than the input voltage.

16. The method of claim 10, wherein the predetermined constant current value is set greater than or equal to the maximum current limit value and set less than or equal to the register-based current limit value.

* * * * *